(12) United States Patent
Oleynik et al.

(10) Patent No.: US 9,178,354 B2
(45) Date of Patent: Nov. 3, 2015

(54) MULTIPURPOSE, UNIVERSAL CONVERTER WITH BATTERY CONTROL AND REAL-TIME POWER FACTOR CORRECTION

(75) Inventors: Vladislav Oleynik, Pittsboro, NC (US); Gennady Albul, Pittsboro, NC (US)

(73) Assignee: 3DFS L.L.C., Pittsboro, NC (US)

( * ) Notice: Subject to any disclaimer, the term of this patent is extended or adjusted under 35 U.S.C. 154(b) by 894 days.

(21) Appl. No.: 13/217,036

(22) Filed: Aug. 24, 2011

(65) Prior Publication Data

US 2013/0049471 A1 Feb. 28, 2013

(51) Int. Cl.
*H02J 1/00* (2006.01)
*H02J 3/00* (2006.01)
*H02J 3/01* (2006.01)
*H02J 3/38* (2006.01)
*H02J 7/00* (2006.01)
*H02J 9/06* (2006.01)

(52) U.S. Cl.
CPC . *H02J 3/01* (2013.01); *H02J 3/381* (2013.01); *H02J 7/0075* (2013.01); *H02J 9/062* (2013.01); *Y02E 40/40* (2013.01); *Y10T 307/62* (2015.04)

(58) Field of Classification Search
CPC .................................................... H02J 9/062
USPC .............. 307/64–66, 72, 74–75, 82, 84, 151; 323/205, 207, 283
See application file for complete search history.

(56) References Cited

U.S. PATENT DOCUMENTS

| | | | |
|---|---|---|---|
| 6,169,669 B1 * | 1/2001 | Choudhury | 363/37 |
| 6,219,623 B1 * | 4/2001 | Wills | 702/60 |
| 8,279,648 B2 * | 10/2012 | Dooley | 363/98 |
| 2003/0052647 A1 * | 3/2003 | Yoshida et al. | 320/125 |
| 2005/0077960 A1 * | 4/2005 | Kim et al. | 330/149 |
| 2005/0258898 A1 * | 11/2005 | Hongo | 330/149 |
| 2008/0290808 A1 * | 11/2008 | Danjo et al. | 315/206 |
| 2009/0237968 A1 * | 9/2009 | Dooley | 363/97 |
| 2010/0201194 A1 * | 8/2010 | Masciarelli et al. | 307/66 |
| 2010/0308751 A1 * | 12/2010 | Nerone | 315/312 |
| 2010/0315849 A1 * | 12/2010 | Ingemi et al. | 363/89 |
| 2011/0155703 A1 * | 6/2011 | Winn | 219/121.54 |
| 2013/0015703 A1 * | 1/2013 | Rouse et al. | 307/18 |

OTHER PUBLICATIONS

Tognolini ((A DSP based Control for a Symmetrical Three-Phase Two-Switch PFC—Power Supply for Variable output Voltage).*

* cited by examiner

*Primary Examiner* — Rexford Barnie
*Assistant Examiner* — Rasem Mourad
(74) *Attorney, Agent, or Firm* — John Sotomayor

(57) ABSTRACT

The Electric Power Converter functions as an uninterruptable power supply, battery management, energy conversion, micro-grid formation, and Power Factor Correction including Total Harmonic Distortion correction in real time. Uninterruptable power supply's use is for always-on, real-time, reduced distortion with functions of load reduction and management during peak load events. The Electric Power Converter is able to establish and sustain a micro-grid with multiple and varying sources of power generation and load conditions. The Electric Power Converter achieves dynamic, real-time, interactive Power Factor Correction (PFC) and advanced voltage harmonic distortion correction with a high efficiency ratio. The Electric Power converter is designed to function with the emerging Smart Grid technologies and provide an overall higher level of operating efficiency and higher quality of electrical power.

15 Claims, 7 Drawing Sheets

MULTIPURPOSE, UNIVERSAL CONVERTER WITH BATTERY CONTROL AND REAL-TIME POWER FACTOR CORRECTION

FIELD OF THE INVENTION

The present invention relates to an apparatus for converting an AC or DC electric input power into DC or AC output with abilities for synchronization with a single or multiphase electric grid, Power Factor Correction (PFC) including Total Harmonic Distortion (THD) correction, an uninterruptable power supply, battery management, battery maintenance, battery storage, energy conversion, electrical grid and micro-grid formation implementation. The invention as disclosed also provides for full control of power conditioning in real time providing correction for multiple different power sources or generators connected to an electrical system.

BACKGROUND OF THE INVENTION

A variety of generally accepted methods and related equipment currently exist for electric power conversion methods, however they can be incompatible with the electrical grid a and/or the exact power supply input requirements. Available and widely used AC/DC to DC converters, or AC/DC to AC converters have a dependency on the load type. Converters that incorporate battery storage are generally defined as an uninterruptible power supply, thus storing power and returning it when peak load or a demand for a load exists or is created.

The modern method for power conversion utilizes an electronic circuit capable of a Pulse Width Modulation (PWM) technique. This technique implements time-advanced feedback where a required output voltage waveform and a low harmonic content can be obtained. These methods utilized in power converters can be used for any kind of distortion and power factor correction in any electrical grid application.

The existing AC grid and future development of the AC grid are plagued by extremely low values of Power Factor (PF), resulting from reactive loads as implemented over the past decades of development. It is not only necessary to provide an optimal PF for a limited number of loads and power supplies, but also a corrected PF. The most promising technologies currently do it in bulk, on an area or block basis. For this reason, PF is mostly never equal to 1, causing energy consumption inefficiency for the US as a whole of over 30% of the consumed energy due to heating dissipation or other dissipative processes.

SUMMARY OF THE INVENTION

The multipurpose, universal power management Converter (Converter) consists of multiple conversion elements and a main controller unit. The conversion stages work in conjunction with each other to provide: battery control and maintenance and multi Digital Signal Processor (DSP) control, with functions for Power Factor Correction (PFC) including Total Harmonic Distortion (THD) or any other type of distortion. The Converter or Converters, working in a common power system, may be enabled to convert any type of input power in AC single phase, AC multiple phases, multiple and single phase AC with DC offset where the Alternative Current (AC) may be in various waveforms, voltages or frequency ranges, or directly to DC. Simultaneously the output power can be produced in the form of a single or multiphase AC output, in various waveforms, voltages or frequencies. The Converter(s) may be directed to one or more target parameters, to be stabilized at certain level of required and desired output. The Converter may be used as a single unit or in conjunction with other Converters, connected to the same power source in parallel, which will provide more power per given output. Alternatively, Converters may be connected in single or multiple units per phase in a multiphase system, where they will provide multiphase operation.

In another embodiment, the output provides, in one non-limiting example, a multiple phase output. In an alternative embodiment, the Converter could provide a different programmable output. In yet another embodiment, when in a serial connection, the Converter would provide a serial step-up output.

In an embodiment, several Converters may be connected together, to power up from the same source, and may work in complete synchronism with each other. In this configuration, a specified phase shift between two or more outputs may be programmed and established. One or more Converters may power a multiple phase grid, or instances of one or more micro-grids, to provide power to a higher hierarchy power energy system. In each of these embodiments, the power generation Converter, with fast data acquisition and fast digital control and feedback, provides syntheses of all required output parameters, with adoptive feedback mechanisms in real time, may supply predictive power management, or may provide adaptive power network compensation. Simultaneously, the converter may provide adaptive Power Factor Correction (PFC) at the time of power generation, to prevent power network overload and distortions.

DETAILED DESCRIPTION

Figure 1:
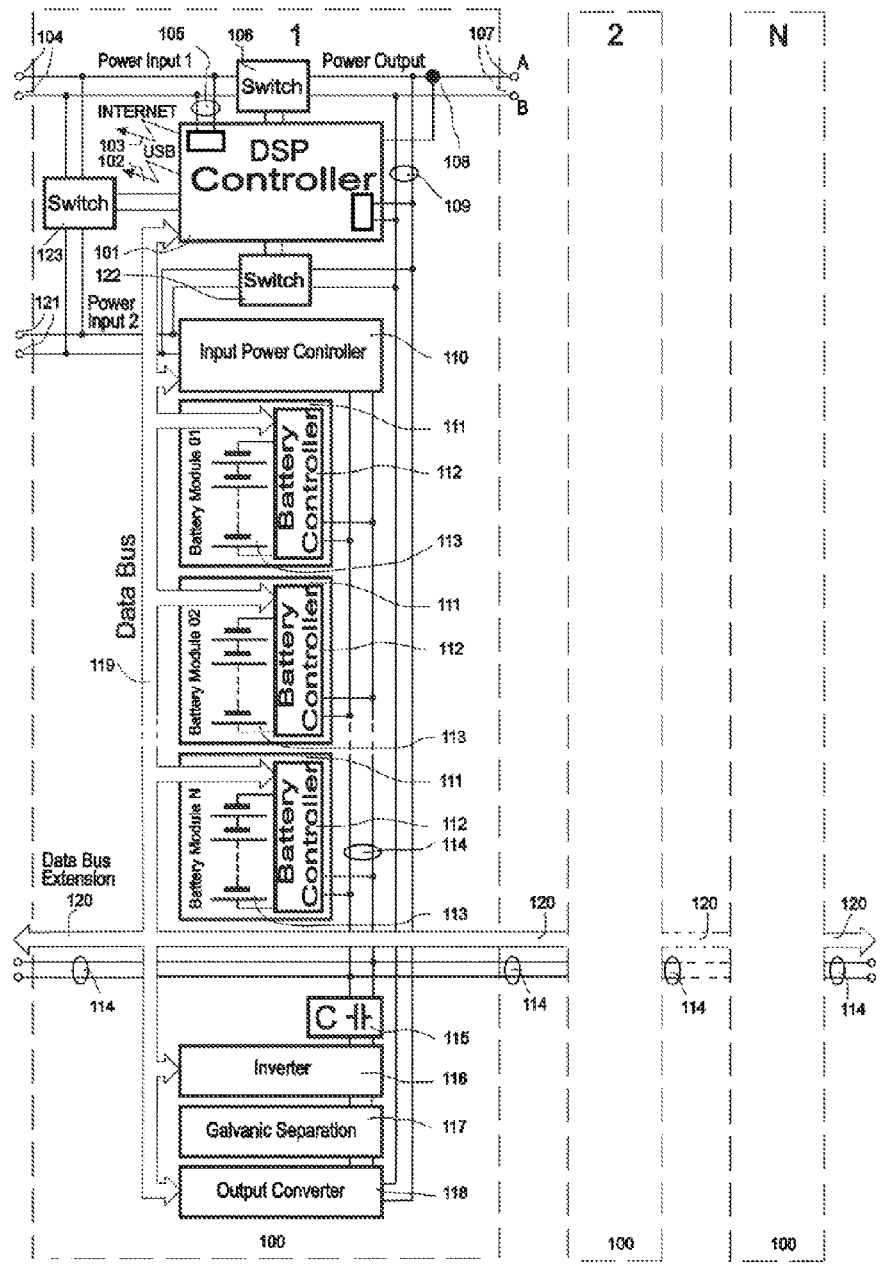
FIG. 1—this figure illustrates the converter apparatus functional diagram consistent with certain embodiments of the invention.

The multipurpose, universal Converter (converter) consists of several functional modules and contains several stages of conversion, in conjunction with controllers, switches, battery controllers and the connections between these components as shown in FIG. 1. In an exemplary embodiment, the block diagram presented in FIG. 1 serves as a description of the converter in its entirety, but also provides a structural view of component portions that may perform individual functions as a portion of the overall converter structure and without departing from the overall functionality.

Components Description

The main components of the Converter are described herein:

1. DSP controller. Major functions of the DSP Controller (101) are: to measure input and output power signal parameters utilizing Measuring Circuit (105), Measuring Circuit (109) and the Current Sensor (108) in real time; controlling all components within the Converter and their current modes that provide the desired output power signal parameters; the exchange of information and synchronization with other Converters if connected. Additionally, the Converter obtains commands and exchanges information with a remote user and/or control devices via an Ethernet, IR, wireless and/or USB or other communication means.

The DSP Controller (101) consists of a signal processor with at least one parallel port, several serial ports and measuring circuits and the means for programming and emulation. The parallel port provides a Data Bus (119), which is connected to each component of the Converter that contains a Microprocessor(s); including but not limited to: the input power controller (110), the battery controller (112), the inverter (116), and the output (118). Data Bus (119) has a Data Bus Extension (120) that is used for fast information exchange with other Converter(s). Remote Converters can be connected through any kind of serial ports, including Ethernet, IR, wireless and or USB or other communication means. The main program and/or additional programmed modules of the Controller principal function include:

a. Initialization which configures all inputs and outputs ports, timers, interrupt system, configuration and activation of Ethernet, IR, wireless and or USB or other communication means and/or other adapters.

b. Connection to PC and/or Internet/Intranet and other Converters, identification and configuration to the surrounding network, establish connection, initialization and mapping of IRQ\IRQL, exchanges information and commands.

c. The primary program configures and controls the Converter components to provide the desired/programmed/optimized operating conditions.

d. Watch Dog function, a special subroutine that will take over when the DSP Controller performs a hard program or hardware stop.

The DSP Controller (101) can be either a single processor or a combination of multiple processors of any type or combination of DSPs.

2. Switch. The Switch (106) disconnects Power Input 1 (104) and Power Output (107) when Converter is in Uninterruptable Power Supply (UPS) mode if the input power is not present. The Switch (106) may be a semiconductor switch and/or electromagnetic relay controlled by the DSP Controller (101). Switches (122), (123) can be a semiconductor switch and/or electromagnetic relay controlled by the DSP Controller (101), or just an electromechanical hardwired connection.

3. Input Power Controller. The Input Power Controller (110) consists of: one or more microprocessor(s) with their measuring and converting circuits; voltage and current sensors to acquire data and define the state of Power Input 2 (121); Pulse Width Modulation (PWM) outputs for efficient input power rectifier control which is necessary to provide the optimal input current curve in accordance with the current Converter mode; power supply that is utilized for powering the Power Controller (110); DSP Controller (101) shared with other components and auxiliaries of the Converter; input passive low-pass filter that eliminates the impact of PWM switching ripple on the input power circuit. The input voltage may be, in a non-limiting example, 115 v, AC 60 Hz, or in another example 220v, AC 50 Hz, or in another non-limiting example, 300 v, DC, or any other AC or DC voltage level configuration. Each input voltage level may be converted into an internal accepted DC and via special current controller may supply the converted voltage level to the converter output, and eventually to Capacitor C (115). It also has features of a boost converter or down converter depending upon the difference between Power Input 2 (121) voltage and the Battery Module (113) desired input voltage, or Inverter (116) desired input voltage, or the Output Converter (118) desired input voltage, or Converter's inner requirements. The Input Power Controller (110) also incorporates commonly available powerful output semiconductor switches including, but not limited to, CMOS based, Darlington, or IGBT switches.

4. Battery Controller. The Battery Controller (112) is the main part of the Battery Module (111) which also consists of a Battery or Batteries (113). The Battery Controller (112) primary role is to exchanges energy between the Battery Module (111) and the Capacitor C (115). The Battery Controller (112) acquires data from various sensors of the current Battery (113) condition, the battery historical and passport data stored in the battery controller memory, and battery historical and passport data stored in the memory of the DSP Controller (101). Based on the condition of the battery and desired operation mode, the Battery Controller (112) provides optimal charge and discharge modes and full battery maintenance in real time, and provides the output power to the Capacitor C (115). In one mode of operation, the Battery Controller (112) will absorb power from Charging Circuit (114) and provide power for charging the Battery (113). In another mode of operation, the Battery Controller (112) will discharge the Battery (113) providing power to the Capacitor C (115). Switching between modes is controlled by selection of the mode of operation. The first mode of operation is the operation mode. The second mode of operation is a maintenance mode, where the Battery (113) will be discharged or charged at specific rate to prolong the life of the batteries and their maximum output. The maintenance mode operation also permits the destruction of any dendrites in case of lithium-ion batteries, or may decrease disulfide areas in acid batteries. The Battery Controller (112) also incorporates commonly available powerful output semiconductor switches including, but not limited to, CMOS based, Darlington, or IGBT switches.

5. Capacitor. The role of the Capacitor C (115) is to provide intermediate energy storage. The requirement of the Capacitor C (115) is to provide the necessary energy to maintain function of the system in a desired mode. Capacitor C (115) is connected in parallel to the Charging Circuit (114). Electrolytic capacitor or a battery of electrolytic capacitors would be used in one embodiment. Other types of high capacity capacitors may also be used in additional embodiments. The battery of capacitors would have a high frequency film or ceramic capacitors in parallel with the electrolyte capacitor(s) for effective power utilization. In another embodiment, capacitor(s) in the capacitor battery would be connected or disconnected by semiconductor and/or electromagnetic relay(s) controlled by the DSP Controller (101), providing the exact capacitance and optimized energy utilization necessary in a wide range of required operation modes.

6. Inverter. The Inverter (116) is designed to convert a DC input to AC output with maximized efficiency with high frequency output through the Galvanic Separation (117) to the Output Converter (118). The Inverter (116) contains; one or more microprocessor(s) with embedded software, measuring circuits with A to D and D to A converters, and PWM outputs for effective power circuit control. The Inverter (116) has a connection with the DSP Controller (101) through the Data Bus (119) for data exchange and feedback relating to output voltage and operation frequency. The Inverter (116) incorporates commonly available powerful output semiconductor switches including, but not limited to, CMOS based, Darlington, or IGBT switches.

7. Galvanic Separation. The role of the Galvanic Separation (117) component is to provide ground and power isolation between the Inverter (116) and the Output Converter (118). This is achieved with capacitive isolation in one instance or transformer isolation in another instance.

Output Converter. The role of the Output Converter (118) is to provide desired Converter power output. The Output Converter (118) provides power conversion coming from Input Power Controller (110), Battery Modules (111) and Capacitor C (115) through Inverter (116) and Galvanic Separation (117) to desire Power Output (107). Depending upon the mode of operation, power would come from Input Power Controller (110) directly or would be stored and recovered from Battery Modules (111), with Capacitor C (115) through the Inverter (116) and Galvanic Separation (117). The Output Converter (118) contains: microprocessor(s) with their software and power circuits; measuring circuits with their A to D converter circuits; and PWM outputs for efficient power circuit control. The microprocessor(s) has a connection and established communication with DSP Controller (101) through the Data Bus (119). A data exchange consists of: output voltage parameters and their feedback; output current curves shape and their feedback; voltage frequency and shape and their feedback; in case of connection to the AC power, synchronization conditions will be established and sent to; other parameters. The Power circuit of the Output Converter (118) incorporates semiconductor switches, where in one instance the power circuit could be a CMOS based, or in another instance a Darlington, IGBT or other type of transistor based device. The Output Converter (118) also contains an output passive low-pass filter to eliminate PWM switching ripple, which would be active and controllable in case of the presence of variable base frequencies output.

Components Interaction Description

In an exemplary embodiment, two Power Inputs are shown (104, 121), where each power input could be connected to separate DC or AC power sources, and in another embodiment, each power input would be connected to the same DC power source or AC power source by Switch (123). Input Power connected through Power Input 2 (121) into the Input Power Controller (110) will be converted to Capacitor C (115) charging power by Charging Circuit (114). Power Input 2 (121), may be connected to a DC power source, such as, in a non-limiting example, a solar battery, a wind generator output, or a wave-energy power plant. In an alternative non-limiting example, the Power Input 2 (121) may be connected to the conventional AC grid, or to a DC or AC microgrid. The resulting power conversion by the Input Power Controller (110) is DC power, which is then stored in Capacitor C (115). Output voltage of the first stage of conversion by the Input Power Controller (110) is dependent on required output parameters, desired overall efficiency, and further down conversion stages requirements, etc., and would be dynamically programmed and controlled by the DSP Controller (101). The role of the Capacitor C (115) is to store energy provided by several Battery Modules (111) and Input Power Controller (110) and provide power for all connected loads, including an Inverter (116) and Battery Modules (111).

Battery Modules (111) are used as a charger, discharger and maintainer for the batteries. Each Battery Module (111) has one or several Batteries (113) and a Battery Controller (112). Batteries (113), in one instance may consist of a sealed Lead—acid battery, in another instance each battery could be, but is not limited to, Lithium-ion battery and or a Lithium-ion phosphate battery. The main parameter for selection of the battery is the total capacitance (ampere hours) with respect to weight in one non-limiting instance or with respect to volume in another non-limiting instance. The battery Controller (112) functions as a charger, discharger, maintainer, and battery health, useful lifetime etc., and monitoring device. The functionality of the Battery Controller (112) is as a DC to DC bidirectional converter and is controlled by the built-in DSP. The internal Digital Signal Processor (DSP) has numerous sensors, inputs, outputs, data bus, internal data storage, and an always-on communication to the DSP Controller (101) via the Data Bus (119). The Battery Controller (112) uses energy stored in Capacitor C (115) to charge Batteries (113) in the Battery Module (111), as well as converting the energy stored in the Batteries (113) and returning energy back to Capacitor C (115) when required based upon the operation mode.

In an embodiment, the energy stored in Capacitor C (115) is used by the Inverter (116) to generate high frequency AC output for effective Galvanic Separation (117). In another embodiment, where galvanic separation is not required, Capacitor C (115) with its Charging Circuit (114), can be connected directly to the Output Converter (118). Output Converter (118) contains a high frequency PWM controller with voltage or current output generating power output according to what the load requires. In one instance it will be highly stable DC output with a programmable voltage, in another instance it will be AC output with programmable voltage, frequency and waveform. If the Switch (106) is opened and Power Input 1 (104) connected to a load, the output of Output Converter (118) is locked or works in synchronization with the Converter Power Output (107), providing Power Factor Correction (PFC) and waveform correction for Power Input 1 (104). In this case Power Input 1 (104) has to be connected to Power Output (107) in a specific configuration; phase to phase or neutral to neutral as a load requires. If Switch (106) disconnects Power Input 1 (104) from Power Output (107), and Inverter (116) and Galvanic Separation (117) is in use, the wires of the Power Output (107) can be connected to the load in any order according to load input polarity if the power output is DC, alternatively the load must connect phase and neutral position if the power output is single phase AC. For a multiphase AC output wire "A" has to be a phase, and wire "B" has to be neutral. DSP Controller (101) is connected to the input power controller module (110), one or more battery controller modules (112), the inverter module (116), and the output converter module (118) of the Converter through the Data Bus (119). The DSP Controller controls and synchronizes processes in all converter modules and provides for communication with the Internet or another PC or another Converter(s) through any type of parallel or serial ports such as USB (102), Internet (103), or other network communication channels.

DSP Controller (101) also has a Measuring Circuit (105) for measuring voltage and current in Power Input 1, Measuring Circuits (109) to measure voltage in Power Output (107) and current in the load through Current Sensor (108), a current transformer used to measure AC output or a current-measuring shunt used for DC, a magnetic current sensor or other type of current sensor, or any combination of these devices. The input power controller module (110), battery controller modules (112), inverter module (116), and output converter module (118) contain dedicated microprocessors, or other types of processors with Pulse Width Modulation (PWM) functions for analog power signal management and/ or control. In an additional embodiment, instead of PWM, Frequency Modulation or other types of modulation may be used based upon what modulation is most effective for concurrent mode of operation. Processors in the input power controller module (110), battery controller modules (112), inverter module (116), and output converter module (118) exchange information with DSP Controller (101) through the Data Bus (119) and work under the direction of algorithms for energy saving optimization. DSP Controller (101) can be connected to another Converter or Converters through a Data Bus Extension (120) or a USB port, or other communication means, if several Converters are needed to work in parallel in same phase or in a multiphase system.

Mode of Operation

Figure 1A:
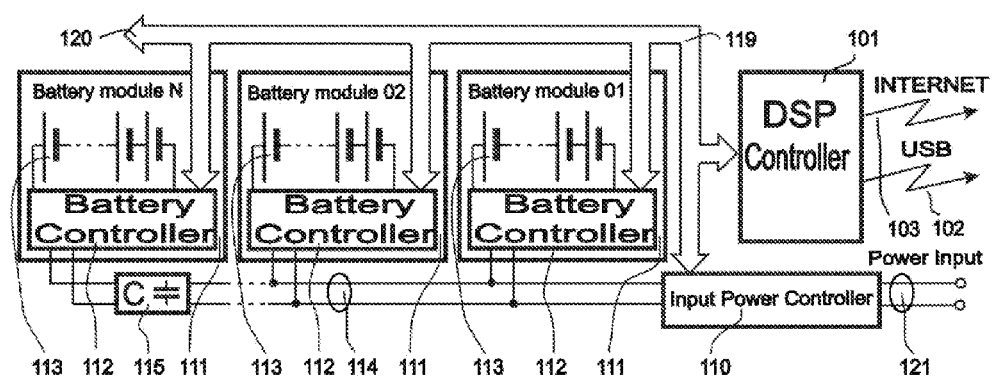
FIG. 1a—this figure illustrates the battery storage and maintenance mode functional diagram consistent with certain embodiments of the invention.

The Converter has several operating modes, either under software control, or by changing the configuration of the hardware. Exemplary embodiments of the operating modes are provided below:

1. Battery storage and maintenance mode. In this implementation a power source is connected to Power Input 2 (121). Power Input 1 (104) and Power Output (107) are disconnected. In this implementation mode, modules and measuring circuits that are not directed to battery operations, enumerated as features (104), (105), (106), (107), (108), (109), (116), (117), (118), (122), (123) of FIG. 1, may not be used and/or can be removed from Converter structure as needed or as required. In an additional embodiment, the converter could be electronically switched to battery storage and maintenance mode, where the modules and measuring circuits that are not directed to battery operations, enumerated as features (104), (105), (106), (107), (108), (109), (116), (117), (118), (122), (123), are not in use as shown on FIG. 1a. In this embodiment, shown in FIG. 1a, the Converter is used as the battery storage only. The Input Power Controller (110) provides an analysis of input energy condition and yields the optimal energy condition on the inputs of Battery Controllers (112). The Battery Controller (112) provides a complete analysis of the condition of the Batteries (113), including but not limited to: charging/discharging modes; time frame associated to charging/discharging; effective capacity in each given time frame; temperatures and degradation of active matter; planned load versus current operation conditions, and additional analytic information as required by a user. The Battery Controller (112) has certain sensors or sensor arrays that measure: acoustical and electrical noise; environmental and battery core temperature; weight; gas output, and other physical parameters. The Battery Controller (112) optionally incorporates, but is not limited to: gas analyzers; ambient pressure sensors; vibrations; bar code scanner, and additional measurement devices. The DSP Controller (101) contains data bases of maintenance parameters for various battery types. These databases can be updated either automatically or manually through the Internet, direct connection or other communication means from a stored database or master database. The DSP Controller (101) updates a master data base and will add data to the knowledge base from operational knowledge gained from the history of batteries connected to the converter and operation parameters. A master database is contained on an internet server or cloud network. DSP Controller (101) will initiate charge—discharge cycles for battery maintenance to perform dendrites destruction in one non-limiting example, or, in another instance, to allow for disulfides destruction on the electrode formation. In this mode, to prevent power losses and unnecessary heating or overheating, Battery Controllers (112) exchange energy with each other by way of Charging Circuit (114) connected to Capacitor C (115), this process step minimizing or completely eliminating energy lost. In a non-limiting example, one controller provides a discharge to a battery and another controller uses that discharge energy to charge a second battery. The DSP Controller (101) exchanges information with Battery controllers (112) through serial or parallel communication channels. The DSP controller keeps the data about each battery quality, parameters and condition when in storage and provides further information for a user via an Internet or PC connection to the DSP Controller (101) through a USB connection or other means of communication.

2. Uninterruptable Power Supply (UPS) mode. In this embodiment an outside power source is connected to Power Input 1 (104) and Power Input 2 (121) by the Switch (123). If the outer power source can provide the required power quality, the DSP Controller keeps the Switch (106) connected and Power Input 1 (104) is connected to Power Output (107). In this embodiment, the batteries are maintained as described in Battery storage and maintenance mode above. The DSP Controller (101) initiates and continuously monitors the measurement cycle from circuits (105), (108), and (109), to continuously monitor and observe the source conditions. If the input power from Power Input 1 (104) disappears or will not meet the minimum required parameters such as voltage, current, wave form, etc., Switch (106) will be disconnected and power will be provided from Battery Modules (111) and the Output Controller (118), providing optimal output parameters. Power will be drained from the Battery Modules (111), through Capacitor C (115) to the Inverter (116), then through the Galvanic Separation module (117) and to the Output Converter (118). When the power from the Power Input 1 (104) is restored, and minimum requirements are met in the programmed values and time frame, the DSP Controller (101) sends a connection signal to the Switch (106) and restores the connection between Power Input 1 (104) and the Power Output (107).

In UPS mode, the Inverter (116) and Galvanic Separation (117) modules can be implemented in the Converter structure if galvanic separation is necessary, for instance when outer energy source connected to Power Input 1 (104) is not galvanically isolated. In another embodiment, when galvanic separation is not required, the Inverter (116) and Galvanic Separation (117) modules can be omitted from the Converter structure. In a non-limiting example, when the Converter is used to provide power to the load on a peaking basis, charging batteries at night or when the demand is low, or electricity cost basis, then the Converter causes the batteries to be discharged while the peak load is high. In this case Switch (106) is engaged and the Converter passes the energy stored within the batteries to the connected electrical grid.

3. Energy format converter mode. Frequently, various installations a DC or specific AC supply but only one type of power source available. In an exemplary embodiment, a Converter would be implemented in such installations as an Energy format converter for desired characteristics, including but not limited to voltage, current, frequency, wave shape, timing, and other electrical power supply characteristics. In this embodiment, an outer electrical source may be connected to Power Input 2 (121) while Switch (106) is set to Off. In an additional non-limiting example, Switch (106) may be removed from Converter structure along with Power Input 1 (104).

Figure 2:
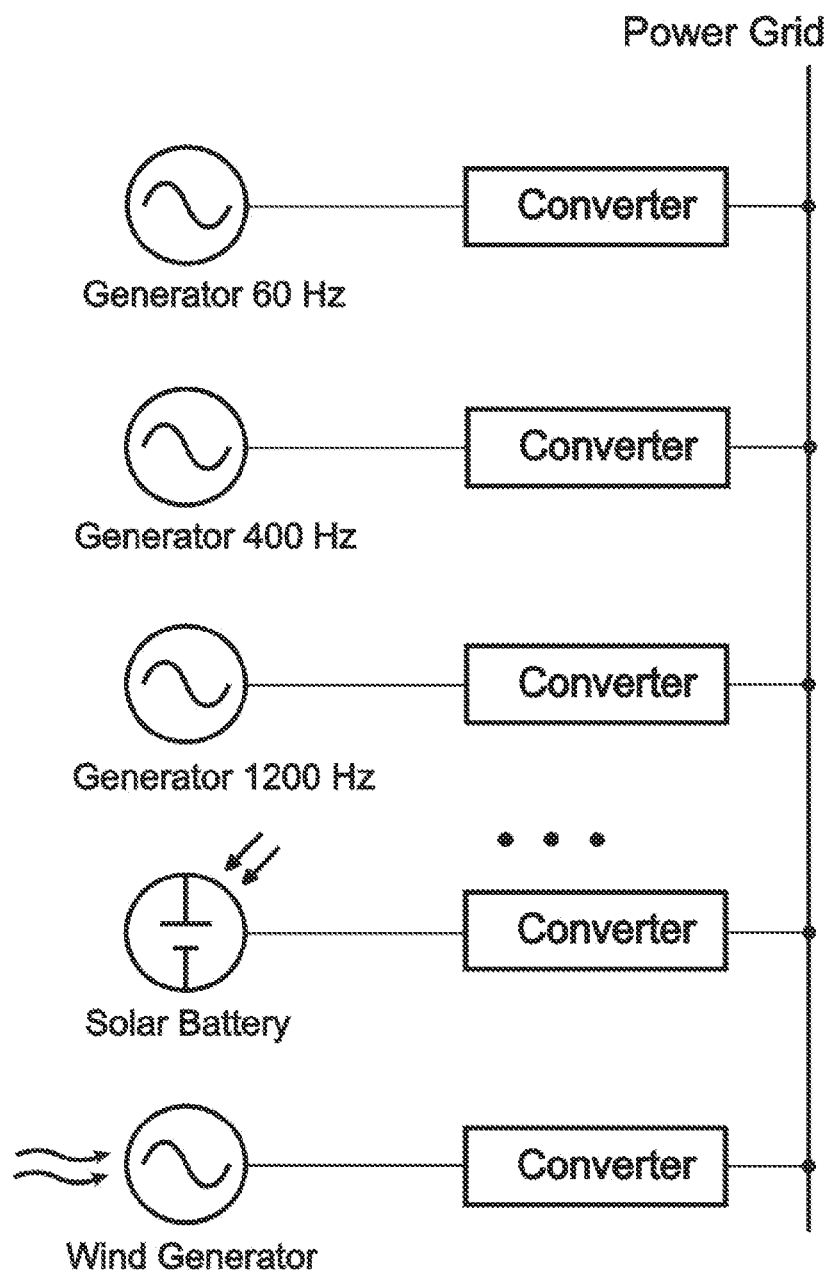
FIG. 2—this figure illustrates the energy format converter mode where different energy sources work on a common Power Grid consistent with certain embodiments of the invention.

Battery Modules (111) will be operated and maintained as described in the UPS mode above. Specifically, in this mode, a Converter, or several Converters connected in parallel as required per load characteristic, can provide the connection of one or several energy sources or generators with unknown or incompatible outputs to common DC, single phase AC, or a multiphase AC electrical grid. The sources can include: diesel and or gas generators; wind generators; solar power plants; wave power plants; geo-thermal power plants; pressurized air energy storage with their generators, etc. as shown in FIG. 2. The DSP Controller (101) contains data in its internal memory or may be updated from a PC, via the Internet, or by other communication means with data containing special features for each specific generator type. The data updates provide optimal load characteristics for each generator separately.

Figure 3:
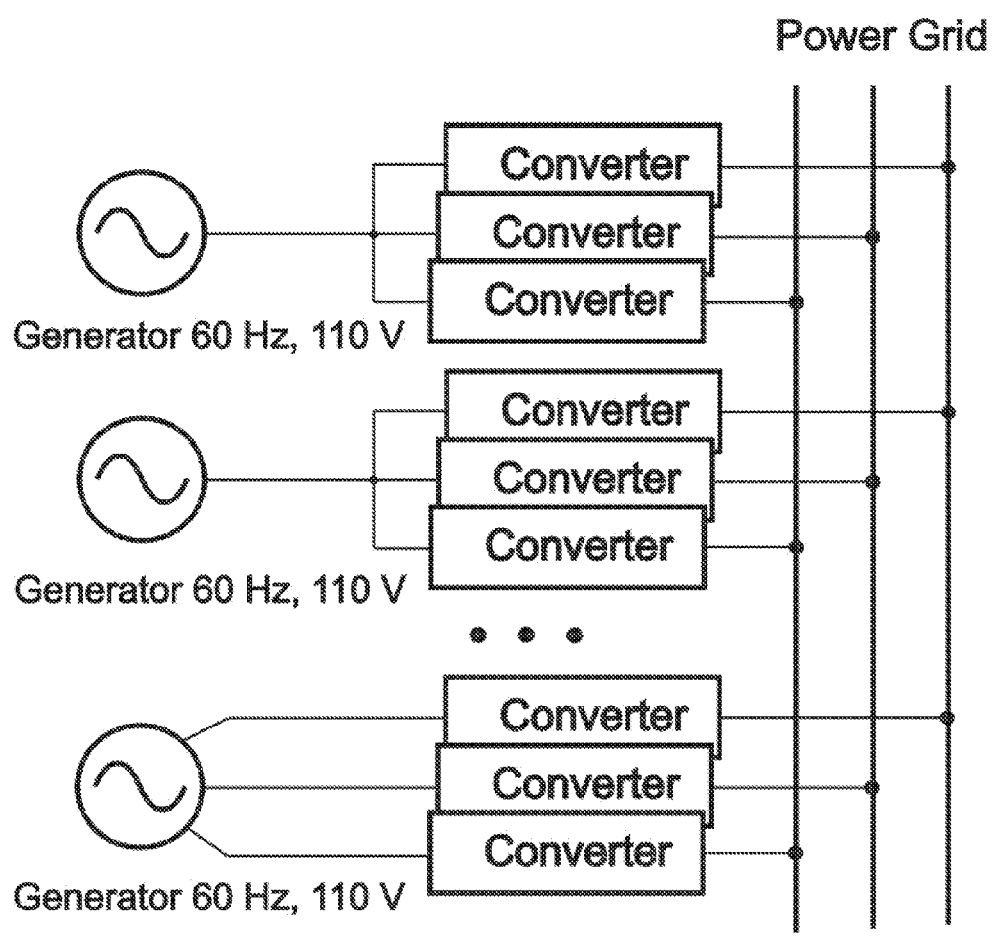
FIG. 3—this figure illustrates the energy format converter mode where different energy sources form a micro-grid consistent with certain embodiments of the invention.

In an additional embodiment, Converters will form a Micro Grid connecting some identical or not identical generators to a single phase or multiphase Micro Grid as shown in FIG. 3 and FIG. 1. FIG. 1 shows the connection of Converters (100) 1, 2, . . . , N with the Data Bus Extension (120) to provide for data exchange and the DC bus (114), providing a parallel connection between capacitors "C" (115) associated with Converters (100) 1, 2, . . . , N for electric power exchange. In this embodiment, one Converter, or group of Converters, connected to one generator are assigned as a Master to establish Micro Grid power parameters. Other Converters may be set to Slaves to follow the Micro Grid power parameters established by the Master, with a feature to keep the earlier established Micro Grid parameters in the event that the Master disappears, disconnects and/or fails. The best performance is achieved when all of the Converters in a Micro Grid are serial port connected by way of Ethernet, wireless, USB et al. into the Micro Grid intranet. In this non-limiting example, Converters form a smart distributed multiprocessor system, exchange information about each other's condition and established Micro Grid parameters. In this example, the Converters may perform tests on each other, reassign a Master as necessary, provide optimal load for each generator, and maintain optimal output parameters, high reliability and full control for the entire Micro Grid in which they are engaged. Each Converter consistently provides perfect and optimal Power Factor (PF) for each connected generator.

In another embodiment, Converters also can be installed on the load side of the Micro Grid to utilize the PFC function when long connections are assumed or high load reactivity predicted. Additionally, the DSP Controller (101) can provide efficient control and real time feedback to a generator in wide range of operation requirements. Such operation requirements include, but are not limited to, start stop procedures, warming up, end of the fuel or out of parameters warning and failure prevention, where, in this case, a set of input sensors with their analog signal forming circuits and output controlling circuits need to be connected. The energy format converter mode is most effective when a given power generator is compatible to the conventional grid, however the energy format converter can operate in a different mode that is incompatible to the conventional grid with a higher efficiency than other energy format converters currently available. The Converter can be implemented to make a selected generator compatible to the conventional grid while the generator is in a non-compatible but higher efficiency mode, thus bringing the overall efficiency of the given generator to higher coefficient than the generator can possibly obtain by itself. The DSP Controller (101) software implements a smart adaptive and predictive algorithm to analyze power circuit conditions, which can prevent resonant conditions, power swings and eliminate system instability. The Energy format converter mode can be combined with the UPS mode or peak demand mode if batteries are charging when power is in surplus supply and return the power back at the time of a given peak load simultaneously with power coming from generators. In other words, if power demand in a MicroGrid is dropping and, statistically for the day time or time of the week, a higher demand is not predicted, a given Converter may lower power from the generator or even completely turn that generator off, to provide fuel savings, and power the grid from stored power in the batteries or distribute the demand power requirements among generators which are still working, by increasing output power. This strategy saves fuel in the short term, and in the long run decreases down-time for mechanical reasons.

Operation Mode Features

General features for all of the above described embodiments, will be essential to efficient operation. Power Factor (PF), harmonic distortions, energy quality improvement and overall Multipurpose Converter Operation feature performance are described hereafter.

1. PFC. This feature allows correction of the Power Factor (PF) to a value of 1 and precisely maintaining that value on a continuous and real-time basis, where at any given moment of time Voltage and Current curves will be sinusoidal and have the same phase. This feature of the Converter self initializes in any mode or circumstance where Voltage and Current inputs are available. The Converter can be used for this purpose directly. The Input Power Controller (110) can take energy when it is in excess and when energy consumption works for distortion compensation, storing it in Capacitor C (115). The Converter returns it back through the Output Converter (118) to provide an optimized current output waveform and provides Power factor Correction (PFC).

Figure 4:
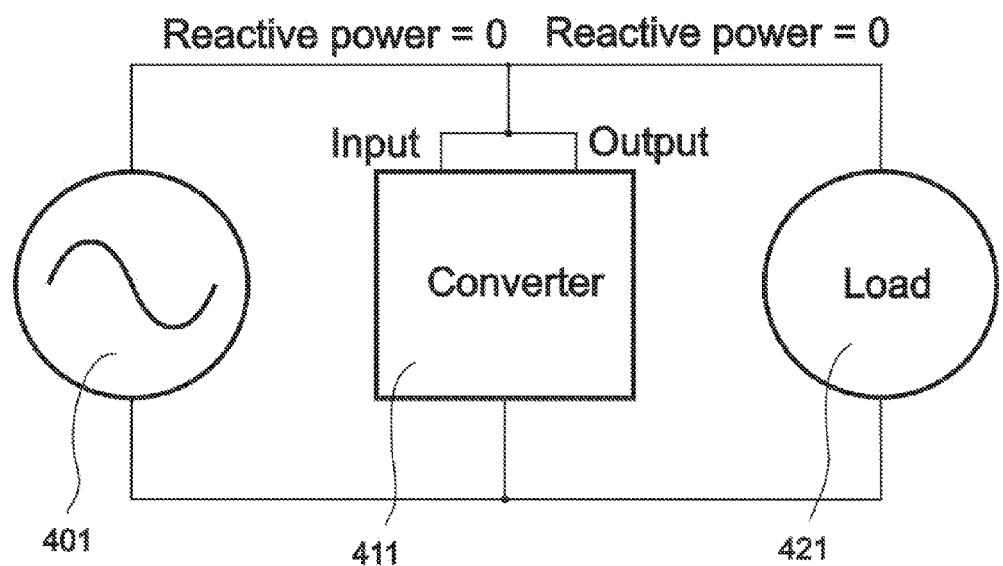
FIG. 4—this figure illustrates the Converter's Power Factor Correction (PFC) feature where the Converter may be used as a reactive dipole consistent with certain embodiments of the invention.

In an exemplary embodiment shown in FIG. 4, schematically, power flows from the Generator (401), to the Load (421) and Converter (411). The Converter (411), connected in parallel with the Generator (401) and Load (421), may operate as a dipole with the transmission line or may be connected closer to the Load (421) or Generator (401). In this embodiment, as previously described, Power Input 2 (121) (FIG. 1) is connected to Power Output (107) by Switch (122) and the Converter behaves as a dipole with real time controllable reactivity connected in a proximity to a load where PF need to be compensated. As a result, the Converter together with the load appears as a pure active load from the viewpoint of the power source, since PF will be compensated to 1.

Figure 5:
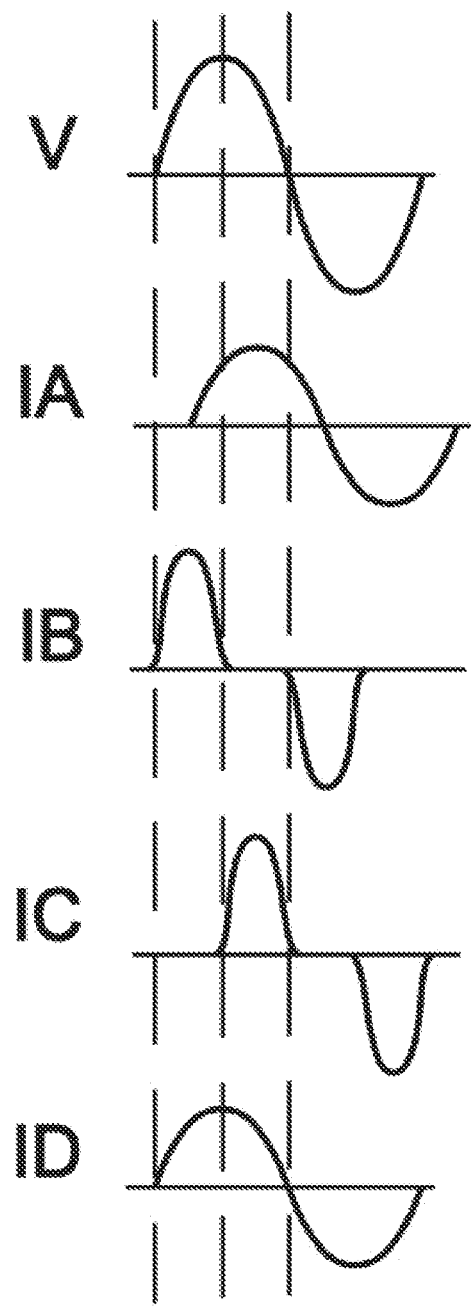
FIG. 5—this figure illustrates the Converter's Power Factor Correction (PFC) feature consistent with certain embodiments of the invention.

As shown on FIG. 5, curve "V" represents voltage. Curve "IA" shows current of inductive load with lagging factor $\cos(q)=0.71$, without the Converter involved in compensation. Curve "IB" shows current consumed by Converter and curve "IC" shows current returned by Converter into the load. As a result, any kind of load where is the Converter is connected, will be an active load as shown on curve "ID". In another embodiment, the Converter with batteries can exchanges energy required for PFC with Battery Modules (111) (FIG. 1) as well as with Capacitor C (115), alternatively, the converter may use energy provided by one or more of the Battery Modules (111) (FIG. 1) for PFC. PFC may be used effectively for transient compensation, such as, in a non-limiting example, during the time needed to compensate the start-stop operation of a motor. The DSP Controller (101) measures the status of power input using the Measuring Circuit (105) to precisely measure load distortions and reactivity. The Measuring Circuits (109) and Current Sensor (108) calculate the optimal modes for the Input Power Controller (110) and the Output Converter (118). The DSP Controller (101) software implements smart adaptive and predictive algorithms to decrease transient shock of the load and energy source(s). The software, using preconfigured input parameters, analyzes power circuit conditions to prevent resonant conditions and eliminate system instability. If load reactivity does not exceed the Converter PFC capability, PF will be corrected completely to a value of 1, if load reactivity exceeds the Converter PFC capability, the DSP Controller (101) calculates and provides partial PFC with no additional distortion.

Figure 6:
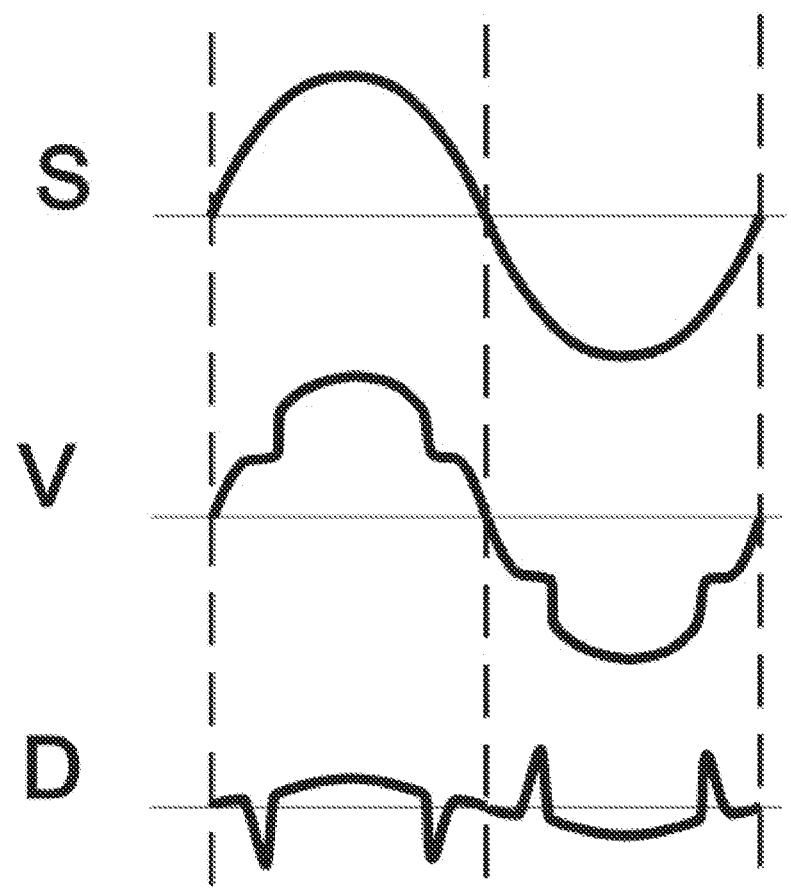
FIG. 6—this figure illustrates the Converter's Distortion Correction feature consistent with certain embodiments of the invention.

2. Voltage Distortion Correction. This feature allows real time decrease or elimination of voltage curve distortions. The DSP Controller (101) calculates the difference between the measured voltage curve from the energy source and the ideal sine waveform of the same frequency and the integrated area between voltage curve and horizontal axis. The result is a distortion curve that may be used as a feedback signal for the correction of load and energy source distortions. These are real time processes capable of keeping voltage waveforms close to the ideal sine waveform. As shown in FIG. 6, the curve "V" represents voltage; the curve "S" shows ideal sine curve; the curve "D" is the distortion curve. Following the curve "D", for the positive half wave, energy has been consumed by Convertor, where the curve is above the horizontal axis and the consumed energy has been returned back where the curve is under the horizontal axis. If power distortions do not exceed the Converter correction capability, distortions will be corrected completely. Alternatively, the DSP Controller (101) calculates and provides partial distortion compensation with no additional distortion. The DSP Controller (101) can be programmed for particular harmonics correction.

The invention claimed is:

1. A multi-function power conditioning and converter apparatus, comprising:
a Digital Signal Processing (DSP) device comprising one or more processors and further comprising a data bus and network communication connection;
a plurality of switches operative to select a mode of operation;
measuring circuits to measure voltage and current for a first power input and a second power input, the measurements transmitted to the DSP device via the data bus;
an input power controller electrically connected to the first power input, the second power input, and a power output;
an inverter device electrically connected to the DSP device and the input power controller through the data bus;
a galvanic separation device electrically connected to the DSP device and the input power controller through the data bus;
an output converter circuit electrically connected to the DSP device through the data bus and electrically connected to the power output;
a plurality of adaptive and predictive software modules implemented in a DSP device processor, the adaptive and predictive software modules accepting input from the measuring circuits and operative to analyze power circuit conditions;
the software modules in the DSP device adapted to calculate and provide partial Power Factor Correction (PFC) through correction of incoming current at the first power input and the second power input when load reactivity exceeds the converter apparatus capability;
the software modules in the DSP device adapted to calculate optimal modes for the input power controller to decrease transient shock to the load and prevent resonant conditions in a power supply circuit.

2. The apparatus of claim 1, further comprising a plurality of battery modules electrically connected to the DSP through the data bus and electrically connected to the capacitor.

3. The apparatus of claim 1, the PFC performed without introducing further distortion.

4. The apparatus of claim 1, where the PFC includes total harmonic distortion correction.

5. The apparatus of claim 3, where the converter, physically connected to an electrical grid and a load in parallel, measures the Power Factor and completely corrects the Power Factor of a load connected to a value approaching or equal to 1.

6. The apparatus of claim 1, where Power Factor Correction can be applied to a load connected to an apparatus utilizing existing passive or active PFC.

7. The apparatus of claim 1, where the converter is connected in parallel with the generator and in parallel with a load operates as a dipole with an energy source supplying incoming power to the apparatus.

8. The apparatus of claim 1, where the adaptive and predictive software modules analyze the power circuit condition to apply PFC to prevent resonant conditions and eliminate system instability.

9. A multi-function power conditioning correction and converter apparatus, comprising:
a Digital Signal Processing (DSP) device comprising one or more processors and further comprising a data bus and network communication connection;
a plurality of switches;
measuring circuits to measure voltage and current for a first power input and a second power input, the measurements transmitted to the DSP device via the data communication bus;
an input power controller electrically connected to a first power input and a second power input and a power output;
an inverter device electrically connected to the DSP device and the input power controller through the data bus;
a galvanic separation device electrically connected to the DSP device and the input power controller through the data bus;
an output converter circuit electrically connected to the DSP device through the data bus and electrically connected to the power output;
the converter apparatus connected in parallel with a generator and in parallel with a load and adapted to operate as a dipole with an energy source to correct incoming current at each power input;
a plurality of adaptive and predictive software modules implemented in a DSP device processor, the adaptive and predictive software modules accepting input from the measuring circuits and operative to analyze power circuit conditions;
the software modules in the DSP device adapted to calculate a voltage distortion curve and apply the voltage distortion curve as a feedback signal to load and energy source voltage distortions to maintain an input voltage waveform for the load and to maintain a voltage waveform for the energy source supplying power to the apparatus.

10. The apparatus of claim 9, further comprising a plurality of battery modules electrically connected to the DSP through the data bus and electrically connected to the capacitor.

11. The apparatus of claim 9, PFC is performed without introducing further distortion to an incoming voltage waveform.

12. The apparatus of claim 11, where the applied voltage curve maintenance includes total or partial voltage waveform distortion correction close to an ideal voltage sine waveform.

13. The apparatus of claim 9, where the converter measures the total harmonic distortion and completely compensates for the total harmonic distortion for any load and partially for a power source.

14. The apparatus of claim 9, where the adaptive and predictive software modules analyze the power circuit condition to apply harmonic correction to prevent resonant conditions and eliminate system instability.

15. A multi-function power correction and converter apparatus, comprising:
- a Digital Signal Processing (DSP) device comprising one or more processors and further comprising a data bus and network communication connection;
- a plurality of switches operative to select a mode of operation;
- measuring circuits to measure voltage and current for a first power input and a second power input, the measurements transmitted to the DSP device via the data bus;
- an input power controller electrically connected to the first power input, the second power input, and a power output;
- an inverter device electrically connected to the DSP device and the input power controller through the data bus;
- a galvanic separation device electrically connected to the DSP device and the input power controller through the data bus;
- an output converter circuit electrically connected to the DSP device through the data bus and electrically connected to the power output;
- a plurality of adaptive and predictive software modules implemented in a DSP device processor, the adaptive and predictive software modules accepting input from the measuring circuits and operative to analyze power circuit conditions;
- the software modules in the DSP device adapted to calculate and provide partial Power Factor Correction (PFC) through correction of incoming current at the first power input and the second power input when load reactivity exceeds the converter apparatus capability; and
- the software modules in the DSP device adapted to calculate a voltage distortion curve and apply the voltage distortion curve as a feedback signal to load and energy source voltage distortions to maintain an input voltage waveform for the load and to maintain a voltage waveform for an energy source supplying power to the apparatus, and to correct distortions in the voltage waveform from said energy source.

* * * * *